US012081954B2

(12) United States Patent
Meng et al.

(10) Patent No.: US 12,081,954 B2
(45) Date of Patent: Sep. 3, 2024

(54) VIRTUAL SURROUND SOUND PRODUCTION CIRCUIT, PLANAR SOUND SOURCE APPARATUS, AND FLAT PANEL DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhaohui Meng, Beijing (CN); Jing Liu, Beijing (CN); Wei Sun, Beijing (CN); Li Tian, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 196 days.

(21) Appl. No.: 17/790,089

(22) PCT Filed: May 24, 2021

(86) PCT No.: PCT/CN2021/095579
§ 371 (c)(1),
(2) Date: Jun. 29, 2022

(87) PCT Pub. No.: WO2021/249172
PCT Pub. Date: Dec. 16, 2021

(65) Prior Publication Data

US 2023/0068347 A1 Mar. 2, 2023

(30) Foreign Application Priority Data

Jun. 9, 2020 (CN) ........................ 202010517863.1

(51) Int. Cl.
*H04S 5/00* (2006.01)
*H04R 5/02* (2006.01)
*H04R 5/04* (2006.01)

(52) U.S. Cl.
CPC ................ *H04R 5/04* (2013.01); *H04R 5/02* (2013.01); *H04R 2420/01* (2013.01);
(Continued)

(58) Field of Classification Search
None
See application file for complete search history.

(56) References Cited

U.S. PATENT DOCUMENTS

2003/0021423 A1* 1/2003 Wood ..................... H04S 1/002 381/19
2005/0117762 A1 6/2005 Sakurai et al.
(Continued)

FOREIGN PATENT DOCUMENTS

CN 101040565 A 9/2007
CN 102438199 A 5/2012
(Continued)

OTHER PUBLICATIONS

Orman, Jack. "Basic Buffers." Muzique, Apr. 3, 2018, www.muzique.com/lab/buffers.htm. (Year: 2018).*
(Continued)

*Primary Examiner* — James K Mooney
(74) *Attorney, Agent, or Firm* — IP & T GROUP LLP

(57) ABSTRACT

A virtual surround sound production circuit includes: a subtraction unit configured to perform subtraction operation on first and second signals to output a third signal; a first addition unit configured to perform addition operation on the first and second signals to output a center channel signal; a surround sound adjustment unit configured to adjust the third signal or another third signal that has undergone
(Continued)

frequency compensation to output a fourth signal; a center compensation unit configured to adjust the center channel signal to output a fifth signal; a second addition unit configured to perform addition operation on the first, fourth and fifth signals to output a first output signal; a phase inverter unit configured to perform phase inversion on the fourth signal to generate a phase-inverted signal; and a third addition unit configured to perform addition operation on the second, fifth and phase-inverted signals to output a second output signal.

16 Claims, 7 Drawing Sheets

(52) U.S. Cl.
CPC .......... *H04R 2499/15* (2013.01); *H04S 5/005* (2013.01); *H04S 2400/05* (2013.01)

(56) References Cited

U.S. PATENT DOCUMENTS

| | | | | |
|---|---|---|---|---|
| 2006/0115091 | A1 | 6/2006 | Kim et al. | |
| 2008/0056503 | A1 | 3/2008 | McGrath | |
| 2008/0101618 | A1* | 5/2008 | Huang | H04S 5/02 381/27 |
| 2010/0158258 | A1 | 6/2010 | Sakurai et al. | |
| 2017/0332184 | A1 | 11/2017 | Lacouture Parodi | |
| 2019/0174248 | A1 | 6/2019 | Nakano | |
| 2020/0177719 | A1* | 6/2020 | Kim | G06F 1/1656 |
| 2020/0267486 | A1 | 8/2020 | Liu | |

FOREIGN PATENT DOCUMENTS

| | | | |
|---|---|---|---|
| CN | 104010264 | A | 8/2014 |
| CN | 106658345 | A | 5/2017 |
| CN | 107258090 | A | 10/2017 |
| CN | 108111962 | A | 6/2018 |
| CN | 108156575 | A | 6/2018 |
| CN | 108632714 | A | 10/2018 |
| CN | 109644316 | A | 4/2019 |
| CN | 111641899 | A | 9/2020 |
| EP | 3595337 | A1 | 1/2020 |
| JP | 2008-154082 | A | 7/2008 |
| JP | 2008-244773 | A | 10/2008 |

OTHER PUBLICATIONS

"Differential amplifier." Wikipedia, Nov. 10, 2018, en.wikipedia.org/wiki/Differential_amplifier. (Year: 2018).*

"The Summing Amplifier." Electronics Tutorials, Jul. 14, 2018, www.electronics-tutorials.ws/opamp/opamp_4.html. (Year: 2018).*

"Inverting Operational Amplifier." Electronics Tutorials, Feb. 14, 2018, www.electronics-tutorials.ws/opamp/opamp_2.html. (Year: 2018).*

"Band-pass Filters." All About Circuits, May 17, 2018, www.allaboutcircuits.com/textbook/alternating-current/chpt-8/band-pass-filters/. (Year: 2018).*

Kugelstadt, Thomas. Op Amps for Everyone—Chapter 16. 2001, pp. 16-1-16-64. (Year: 2001).*

First Office Action for the Chinese Patent Application No. 202010517863.1 issued by the Chinese Patent Office on Mar. 1, 2021.

Second Office Action for the Chinese Patent Application No. 202010517863.1 issued by the Chinese Patent Office on Oct. 18, 2021.

Decision of Rejection for the Chinese Patent Application No. 202010517863.1 issued by the Chinese Patent Office on Mar. 15, 2022.

Notification to Grant Patent Right for Invention for the Chinese Patent Application No. 202010517863.1 issued by the Chinese Patent Office on Aug. 5, 2022.

Head-related transfer functions and virtual hearing, pp. 210-213, Jan. 31, 2008.

Research and System Implementation of Virtual Surround Sound, Nov. 15, 2013.

* cited by examiner

VIRTUAL SURROUND SOUND PRODUCTION CIRCUIT, PLANAR SOUND SOURCE APPARATUS, AND FLAT PANEL DISPLAY DEVICE

CROSS-REFERENCE TO RELATED APPLICATIONS

This application is a national phase entry under 35 USC 371 of International Patent Application No. PCT/CN2021/095579, filed on May 24, 2021, which claims priority to Chinese Patent Application No. 202010517863.1, filed on Jun. 9, 2020, which are incorporated herein by reference in their entirety.

TECHNICAL FIELD

The present disclosure relates to the field of audio signal processing technologies, and for example, to a virtual surround sound production circuit, a planar sound source apparatus, and a flat panel display device.

BACKGROUND

In recent years, with the development of high-density recording media technology, processor technology and display technology, surround sound technology has also been greatly developed.

SUMMARY

In an aspect, a virtual surround sound production circuit is provided. The virtual surround sound production circuit includes a subtraction unit, a first addition unit, a surround sound adjustment unit, a center compensation unit, a second addition unit, a phase inverter unit and a third addition unit. The subtraction unit is configured to perform a subtraction operation on a first signal corresponding to a first sound source and a second signal corresponding to a second sound source, so as to output a third signal. The first addition unit is configured to perform an addition operation on the first signal and the second signal, so as to output a center channel signal. The surround sound adjustment unit is configured to adjust one of the third signal and another third signal that has undergone frequency compensation, so as to output a fourth signal. The center compensation unit is configured to adjust the center channel signal; so as to output a fifth signal. The second addition unit is configured to perform another addition operation on the first signal, the fourth signal and the fifth signal, so as to output a first output signal. The phase inverter unit is configured to perform a phase inversion on the fourth signal, so as to generate a phase-inverted signal. The third addition unit is configured to perform yet another addition operation on the second signal, the fifth signal and the phase-inverted signal, so as to output a second output signal.

In some embodiments, the first output signal is $$S_L = K \cdot \frac{1}{\left(T^2 - T^2\right)} \cdot (T + T) \cdot (H - H) \cdot S,$$

and the second output signal is $$S_R = -K \cdot \frac{1}{\left(T^2 - T^2\right)} \cdot (T + T) \cdot (H - H) \cdot S.$$

K is a constant; $T=T_{LL}=T_{RR}$, where $T_{LL}$ is a head related transfer function (HRTF) signal of the first sound source for an ear of two ears of a sound receiver; and $T_{RR}$ is an HRTF signal of the second sound source for another ear of the two ears; $T'=T_{RL}=T_{LR}$, is where $T_{RL}$ is an HRTF signal of the second sound source for the ear, and $T_{LR}$ is an HRTF signal of the first sound source for the another ear; $H=L_1=R_2$, where $L_1$ is a sound image signal of the first sound source acting on the ear, and $R_2$ is a sound image signal of the second sound source acting on the another ear; $H'=L_2=R_1$, where $L_2$ is a sound image signal of the first sound source acting on the another ear, and $R_1$ is a sound image signal of the second sound source acting on the ear; and S is an original sound source signal.

In some embodiments, the virtual surround sound production circuit further includes a first buffer unit and a second buffer unit. The first buffer unit is configured to receive an audio signal from the first sound source and output the first signal. The second buffer unit is configured to receive an audio signal from the second sound source and output the second signal.

In some embodiments, the first buffer unit includes a first electrolytic capacitor, a first resistor and a first operational amplifier. A negative terminal of the first electrolytic capacitor is configured to receive the audio signal from the first sound source. A positive terminal of the first electrolytic capacitor is connected to a first terminal of the first resistor and a positive input terminal of the first operational amplifier. A second terminal of the first resistor is grounded. A negative input terminal of the first operational amplifier is connected to an output terminal of the first operational amplifier. The output terminal of the first operational amplifier is configured to output the first signal. The second buffer unit includes a second electrolytic capacitor, a second resistor and a second operational amplifier. A negative terminal of the second electrolytic capacitor is configured to receive the audio signal from the second sound source. A positive terminal of the second electrolytic capacitor is connected to a first terminal of the second resistor and a positive input terminal of the second operational amplifier. A second terminal of the second resistor is grounded. A negative input terminal of the second operational amplifier is connected to an output terminal of the second operational amplifier. The output terminal of the second operational amplifier is configured to output the second signal.

In some embodiments, the subtraction unit includes a third resistor, a fourth resistor, a fifth resistor, a sixth resistor and a third operational amplifier. A first terminal of the third resistor is configured to receive the first signal. A second terminal of the third resistor is connected to a negative input terminal of the third operational amplifier and a first terminal of the fourth resistor. A second terminal of the fourth resistor is connected to an output terminal of the third operational amplifier. A first terminal of the fifth resistor is configured to receive the second signal. A second terminal of the fifth resistor is connected to a first terminal of the sixth resistor and a positive input terminal of the third operational amplifier. A second terminal of the sixth resistor is grounded. The output terminal of the third operational amplifier is configured to output the third signal.

In some embodiments, the virtual surround sound production circuit further includes a frequency compensation unit configured to perform the frequency compensation on the third signal and output the another third signal that has undergone the frequency compensation.

In some embodiments, the frequency compensation unit includes a seventh resistor, a fourth operational amplifier, an eighth resistor, a ninth resistor, a tenth resistor, an eleventh resistor, a twelfth resistor, a first capacitor and a second capacitor. A first terminal of the seventh resistor is configured to receive the third signal. A second terminal of the seventh resistor is connected to a negative input terminal of the fourth operational amplifier, a first terminal of the eighth resistor, a first terminal of the ninth resistor and a first terminal of the tenth resistor. A positive input terminal of the fourth operational amplifier is grounded. An output terminal of the fourth operational amplifier is connected to a second terminal of the eighth resistor, a first terminal of the eleventh resistor and a first terminal of the second capacitor, and the output terminal of the fourth operational amplifier is configured to output the another third signal that has undergone the frequency compensation. A second terminal of the ninth resistor, a second terminal of the eleventh resistor and a first terminal of the first capacitor are connected, and a second terminal of the first capacitor is grounded. A second terminal of the tenth resistor, a second terminal of the second capacitor and a first terminal of the twelfth resistor are connected, and a second terminal of the twelfth resistor is grounded.

In some embodiments, the surround sound adjustment unit includes a first potentiometer. A first terminal of the first potentiometer is configured to receive the third signal or the another third signal that has undergone the frequency compensation. A second terminal of the first potentiometer is grounded. An adjusting terminal of the first potentiometer is configured to output the fourth signal.

In some embodiments, the first addition unit includes a thirteenth resistor, a fourteenth resistor, a fifteenth resistor, a sixteenth resistor, a seventeenth resistor and a fifth operational amplifier. A first terminal of the thirteenth resistor is configured to receive the second signal. A first terminal of the fourteenth resistor is configured to receive the first signal. A second terminal of the thirteenth resistor is connected to a second terminal of the fourteenth resistor, a first terminal of the fifteenth resistor and a positive input terminal of the fifth operational amplifier. A second terminal of the fifteenth resistor is grounded. Afirst terminal of the sixteenth resistor is connected to a negative input terminal of the fifth operational amplifier and a first terminal of the seventeenth resistor. A second terminal of the sixteenth resistor is grounded. A second terminal of the seventeenth resistor is connected to an output terminal of the fifth operational amplifier, and the output terminal of the fifth operational amplifier is configured to output the center channel signal.

In some embodiments, the center compensation unit includes a second potentiometer. A first terminal of the second potentiometer is configured to receive the center channel signal. A second terminal of the second potentiometer is grounded. An adjusting terminal of the second potentiometer is configured to output the fifth signal.

In some embodiments, the second addition unit includes an eighteenth resistor, a nineteenth resistor, a twentieth resistor, a twenty-first resistor and a sixth operational amplifier. A first terminal of the eighteenth resistor is configured to receive the first signal. A first terminal of the nineteenth resistor configured to receive the fifth signal. A first terminal of the twentieth resistor is configured to receive the fourth signal. A second terminal of the eighteenth resistor is connected to a second terminal of the nineteenth resistor, a second terminal of the twentieth resistor, a negative input terminal of the sixth operational amplifier and a first terminal of the twenty-first resistor. A positive input terminal of the sixth operational amplifier is grounded. An output terminal of the sixth operational amplifier is connected to a second terminal of the twenty-first resistor, and is configured to output the first output signal.

In some embodiments, the phase inverter unit includes a twenty-second resistor, a twenty-third resistor and a seventh operational amplifier. A first terminal of the twenty-second resistor is configured to receive the fourth signal. A second terminal of the twenty-second resistor is connected to a negative input terminal of the seventh operational amplifier and a first terminal of the twenty-third resistor. A positive input terminal of the seventh operational amplifier is grounded. An output terminal of the seventh operational amplifier is connected to a second terminal of the twenty-third resistor, and is configured to output the phase-inverted signal.

In some embodiments, the third addition unit includes a twenty-fourth resistor, a twenty-fifth resistor, a twenty-sixth resistor, a twenty-seventh resistor and an eighth operational amplifier. A first terminal of the twenty-fourth resister is configured to receive the phase-inverted signal. A first terminal of the twenty-fifth resistor is configured to receive the fifth signal. A first terminal of the twenty-sixth resistor is configured to receive the second signal, A second terminal of the twenty-fourth resistor is connected to a second terry inal of the twenty-fifth resistor, a second terminal of the twenty-sixth resistor, a negative input terminal of the eighth operational amplifier and a first terminal of the twenty-seventh resistor. A positive input terminal of the eighth operational amplifier is grounded. An output terminal of the eighth operational amplifier is connected to a second terminal of the twenty-seventh resistor, and is configured to output the second output signal.

In some embodiments, the virtual surround sound production circuit further includes a first filter output unit and a second filter output unit. The first filter output unit is configured to filter the first output signal and output the filtered first output signal. The second filter output unit is configured to filter the second output signal and output the filtered second output signal.

In some embodiments, the first filter output unit includes a twenty-eighth resistor, a twenty-ninth resistor, a third capacitor and a third electrolytic capacitor. A first terminal of the twenty-eighth resistor is configured to receive the first output signal. A second terminal of the twenty-eighth resistor is connected to a first terminal of the third capacitor and a positive terminal of the third electrolytic capacitor. A second terminal of the third capacitor is grounded. A negative terminal of the third electrolytic capacitor is connected to a first terminal of the twenty-ninth resistor, and is configured to output the filtered first output signal. A second terminal of the twenty-ninth resistor is grounded. The second filter output unit includes a thirtieth resistor, a thirty-first resistor, a fourth capacitor and a fourth electrolytic capacitor. A first terminal of the thirtieth resister is configured to receive the second output signal. A second terminal of the thirtieth resistor is connected to a first terminal of the fourth capacitor and a positive terminal of the fourth electrolytic capacitor. A second terminal of the fourth capacitor is grounded. A negative terminal of the fourth electrolytic capacitor connected to a first terminal of the thirty-first resistor, and is configured to output the filtered second output signal. A second terminal of the thirty-first resistor is grounded.

In another aspect, a planar sound source apparatus is provided. The planar sound source apparatus includes the virtual surround sound production circuit according to any one of the above embodiments.

In yet another aspect, a flat panel display device is provided. The flat panel display device includes the planar sound source apparatus according to any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
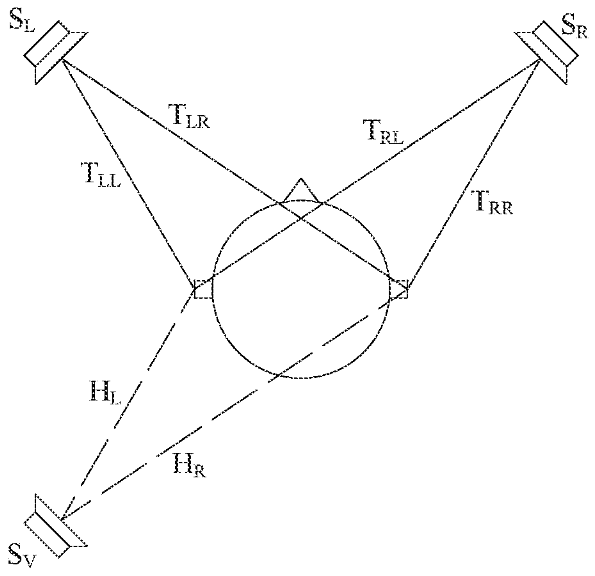
FIG. 1 is a model diagram of a virtual surround sound source, in accordance with some embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The use of the phase "applicable to" or "configured to" herein means an open and inclusive expression, which does not exclude devices that are applicable to or configured to perform additional tasks or steps.

Additionally, the use of the phase "based on" is meant to be open and inclusive, since a process, step, calculation, or other action "based on" one or more of the stated conditions or values may, in practice, be based on additional onditions or values exceeding those stated.

During the development of surround sound technology, two parallel development directions have gradually formed, which are multi-channel surround sound technology and virtual surround sound technology. The two technologies are based on different acoustic principles, and has the following characteristics: the multi-channel surround sound technology generally adopts a plurality of speakers, and 3 to 7 speakers are distributed in a surrounding way in space, and thus are complicated in spatial distribution and wiring, but a surround sound field may be established through separate response of the speakers at different positions; the virtual surround sound technology is relatively simple to implement, and needs only two independent speakers distributed on left and right sides of a sound source to realize establishment of information of a sound field by a head-related transfer function (HRTF).

For a display device that needs to real ze sound production of a display screen, since a sound source is disposed in a flat panel display, the sound production of the display screen cannot be realized by using the multi-channel surround sound technology. If the speaker is disposed in the flat panel display device, sound waves generated by the speaker may exit toward a rear or a lower portion of a display panel, rather than a front of an image displayed on the display panel. Therefore, the sound waves may not travel along a direction toward a viewer viewing displayed contents in front of the flat panel display. Since the sound waves generated by the speaker exit toward the rear or the lower portion of the display panel, a sound quality may be reduced due to interference of reflection of the sound waves by a wall or a floor. Consequently, an immersive experience of the viewer may be reduced. In a kit for a large display scheme such as a television and a large-sized spliced screen, if a plurality of speakers are provided at different positions therein to form multi-channel surround sound, then the speakers may occupy additional space, thereby limiting design and spatial arrangement of the kit.

Some embodiments of the present disclosure provide a virtual surround sound production circuit. A mathematical model based on an interaural time difference (ITD) theory established for designing the virtual surround sound production circuit will be first introduced below.

During hearing in virtual space, increasing the ITD in a certain way may cause a position where a human brain perceives a sound image to shift in a corresponding direction. Different delays of certain channel signals A and B may cause a corresponding change of the position of the sound image in the human brain. For example, in a case where the ITD varies between 0 millisecond (ms) to 0.7 ms, the position of the sound image moves from a center of the brain to the right (or left) along an axis between two ears, and the ITD plays a same role as that during hearing in real space. However, in a case where the ITD varies between 0.7 ms to 35 ms, the position of the sound image no longer moves to the right (or left), and a shape of the sound image changes.

By using a spatial auditory module and the HRTF theory, the "image" information of the sound source may be established as follows:

$$H_L = K \cdot T_L$$

$$H_R = K \cdot T_R$$

where $H_L$ is response of a left channel to a sound source signal S, $H_R$ is response of a right channel to the sound source signal S, the sound source signal S may also be referred to as an original sound source signal, $T_L$ is an HRTF signal of the sound source for a left ear, $T_R$ is an HRTF signal of the sound source for a right ear, and K is a constant.

A matrix of the "image" information of the sound source is expressed as:

$$\begin{bmatrix} D_L \\ D_R \end{bmatrix} = \begin{bmatrix} H_L \\ H_R \end{bmatrix} \cdot S = K \cdot \begin{bmatrix} T_L \\ T_R \end{bmatrix} \cdot S \quad (1)$$

where $D_L$ is a signal that finally reaches the left ear, and $D_R$ is a signal that finally reaches the right ear.

According to the above model, a virtual surround sound source may be established by using two speakers, which is shown in FIG. 1.

Then, a formula of information of the sound image is as follows:

$$\begin{bmatrix} D_L \\ D_R \end{bmatrix} = \begin{bmatrix} T_{LL} & T_{RL} \\ T_{LR} & T_{RR} \end{bmatrix} \cdot P \cdot S_v = K \cdot \begin{bmatrix} T_L \\ T_R \end{bmatrix} \cdot S_v \quad (2)$$

where $T_{LL}$ is an HRTF signal of a left sound source for the left ear, $T_{RL}$ is an HRTF signal of a right sound source for the left ear, $T_{LR}$ is an HRTF signal of the left sound source for the right ear, $T_{RR}$ is an HRTF signal of the right sound source for the right ear, P is a transmission matrix of a signal processing network, and $S_V$ is a virtual sound source signal.

After the formula of the information of the sound image is transformed, the relational formula may be obtained as follows:

$$P = K \cdot \begin{bmatrix} T_{LL} & T_{RL} \\ T_{LR} & T_{RR} \end{bmatrix}^{-1} \cdot \begin{bmatrix} T_L \\ T_R \end{bmatrix} \quad (3)$$

where "−1" in $[\ ]^{-1}$ epresents an inverse matrix.

Based on this, a left virtual surround sound signal is $$S_L = P_L \cdot L_S \quad (4)$$

a right virtual surround sound signal is $$S_R = P_R \cdot R_S \quad (5)$$

where $P_L$ is a transmission matrix of a signal processing network of the left sound source, $L_S$ is a sound image signal of the left sound source, $P_R$ is a transmission matrix of a signal processing network of the right sound source, and $R_S$ is a sound image signal of the right sound source.

Based on this, it may be obtained that the left virtual surround sound signal $S_L$ is $$S_L = \begin{bmatrix} S_{LL} \\ S_{LR} \end{bmatrix} = K \cdot \begin{bmatrix} T_{LL} & T_{RL} \\ T_{LR} & T_{RR} \end{bmatrix}^{-1} \cdot \begin{bmatrix} L_1 \\ L_2 \end{bmatrix} \cdot L_S$$

the right virtual surround sound signal $S_R$ is $$S_R = \begin{bmatrix} S_{RL} \\ S_{RR} \end{bmatrix} = K \cdot \begin{bmatrix} T_{LL} & T_{RL} \\ T_{LR} & T_{RR} \end{bmatrix}^{-1} \cdot \begin{bmatrix} R_1 \\ R_2 \end{bmatrix} \cdot R_S$$

where $S_{LL}$ is a left-related channel signal of the left ear, SLR is a right-related channel signal of the left ear; $S_{RL}$ is a left-related channel signal of the right ear, and $S_{RR}$ is a right-related channel signal of the right ear; $L_1$ is a sound image signal of the left sound source acting on the left ear; $L_2$ is a sound image signal of the left sound source acting on the right ear, $R_1$ is a sound image signal of the right sound source acting on the left ear, and $R_2$ is a sound image signal of the right sound source acting on the right ear.

In a case where a transmission medium is uniform throughout hearing space, at a position of a midline of a double sound source formed by the left sound source and the right sound source, the response to the sound waves is isotropic, That is, $T_{LL}=T_{RR}$ and $T_{RL}=T_{LR}$ are satisfied. Therefore, it may be supposed that $T_{LL}=T_{RR}=T$, and $T_{RL}=T_{LR}=T'$. In a case where left and right surround sound boxes (or speakers) are symmetrical with respect to a midline of two sound boxes in front, and both ears have same HRTF is properties, $L_1=R_2$ and $L_2=R_1$ are satisfied. Therefore, it may be supposed that $L_1=R_2=H$, and $L_2=R1=H'$. In addition, it may be known that $L_S=L-R=S$, and $R_S=R-L=-S$, in which L is the left sound source signal, and R is the right sound source signal. Therefore, a sum of the virtual left and right surround sound signals obtained at the two sound boxes in front is as follows:

$$\begin{bmatrix} S_L \\ S_R \end{bmatrix} = \begin{bmatrix} S_{LL} \\ S_{LR} \end{bmatrix} + \begin{bmatrix} S_{RL} \\ S_{RR} \end{bmatrix}$$

$$= K \cdot \begin{bmatrix} T & T \\ T & T \end{bmatrix}^{-1} \cdot \begin{bmatrix} H \\ H \end{bmatrix} \cdot S - K \cdot \begin{bmatrix} T & T \\ T & T \end{bmatrix}^{-1} \cdot \begin{bmatrix} H \\ H \end{bmatrix} \cdot S$$

-continued $$= K \cdot \begin{bmatrix} T & T \\ T & T \end{bmatrix}^{-1} \cdot \begin{bmatrix} H - H' \\ H' - H \end{bmatrix} \cdot S$$

$$= K \cdot \frac{1}{T^2 - T^2} \cdot \begin{bmatrix} T & -T \\ -T & T \end{bmatrix} \cdot \begin{bmatrix} H - H' \\ H' - H \end{bmatrix} \cdot S$$

where $$\begin{bmatrix} T & T' \\ T' & T \end{bmatrix}$$

is a 2×2 matrix, and $$\begin{bmatrix} H - H' \\ H' - H \end{bmatrix}$$

is a 2×1 matrix formed by (H–H') and (H'–H).

It may be obtained after derivation that:

$$S_L = K \cdot \frac{1}{(T^2 - T^2)} \cdot [T \cdot (H - H') - T' \cdot (H' - H)] \cdot S = K \cdot \frac{1}{(T^2 - T^2)} \cdot (T + T') \cdot (H - H') \cdot S$$

$$S_R = K \cdot \frac{1}{(T^2 - T^2)} \cdot [-T \cdot (H - H) + T \cdot (H - H)] \cdot S = -K \cdot \frac{1}{(T^2 - T^2)} \cdot (T + T) \cdot (H - H) \cdot S$$

Therefore, a virtual surround sound production network needs to meet $$F = K \cdot \frac{1}{(T^2 - T^2)} \cdot (T + T) \cdot (H - H) \cdot S,$$

or a circuit characteristic of the virtual surround sound production circuit is $$F = K \cdot \frac{1}{(T^2 - T^2)} \cdot (T + T) \cdot (H - H) \cdot S.$$

It can be understood that, the circuit characteristic includes limitations on the left sound source signal L and the right sound source signal R.

Figure 2:
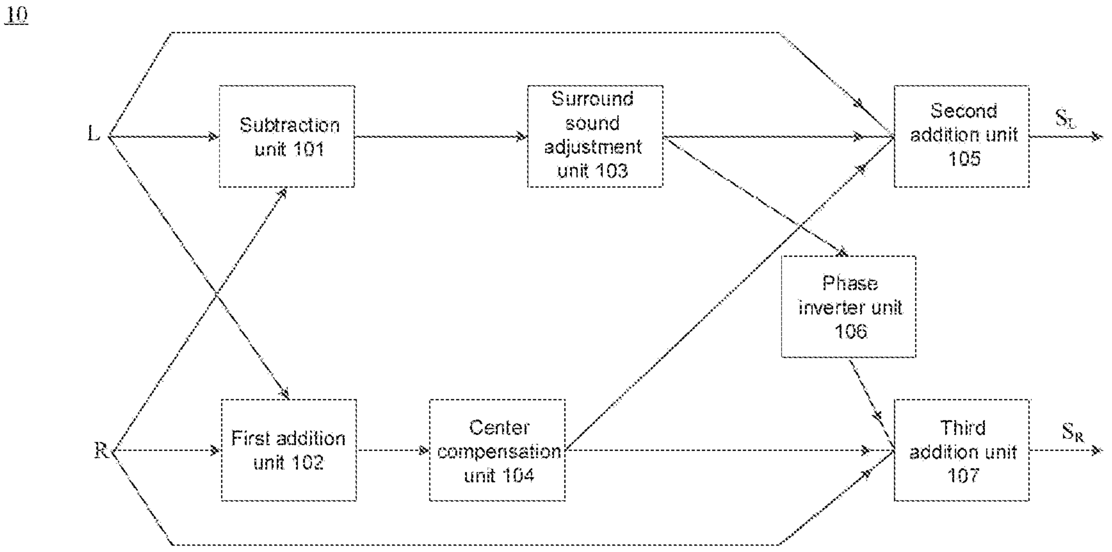
FIG. 2 is a structural block diagram of a virtual surround sound production circuit, in accordance with some embodiments of the present disclosure.

Based on this, some embodiments of the present disclosure provide the virtual surround sound production circuit 10. Referring to FIG. 2, the virtual surround sound production circuit 10 includes a subtraction unit 101, a first addition unit 102, a surround sound adjustment unit 103, a center compensation unit 104, a second addition unit 105, a phase inverter unit 106 and a third addition unit 107.

The subtraction unit 101 is configured to perform a subtraction operation on a first signal L corresponding to a first sound source and a second signal R corresponding to a second sound source, so as to output a third signal. The first signal L and the second signal R are respectively common two-channel stereo audio signals corresponding to a left sound source and a right sound source of a planar sound source apparatus, such as the left sound source signal L and the right sound source signal R described above.

The first addition unit 102 is configured to perform an addition operation on the first signal L and the second signal R to output a center channel signal.

The surround sound adjustment unit 103 is configured to adjust one of the third signal output by the subtraction unit 101 and another third signal that has undergone frequency compensation, so as to output a fourth signal. That is, the surround sound adjustment unit 103 is configured to adjust a component of the surround sound, thereby adjusting intensity of a sense of space of a three-dimensional sound field, so as to output an adjusted surround sound signal (i.e., the adjusted third signal or the adjusted another third signal).

The center compensation unit 104 is configured to adjust (i.e., perform a center compensation on) the center channel signal output by the first addition unit 102, so as to adjust intensity of center sound, and output a fifth signal (i.e., the adjusted center channel signal).

The second addition unit 105 is configured to perform an addition operation on the first signal, the fourth signal and the fifth signal, so as to output a first output signal.

That is, the second addition unit 105 is configured to perform an addition operation on the first signal L, the adjusted third signal (or the adjusted another third signal) and the adjusted center channel signal, so as to mix sound, and generate a left virtual surround sound signal $S_L$ and output it.

The phase inverter unit 106 is configured to perform a phase inversion on the fourth signal, so as to generate a phase-inverted signal (i.e. the phase-inverted fourth signal).

The third addition unit 107 is configured to perform an addition operation on the second signal, the fifth signal and the phase-inverted signal, so as to output a second output signal. That is, the third addition unit 107 is configured to perform an addition operation on the second signal R, the phase-inverted fourth signal and the adjusted center channel signal, so as to mix sound, and generate the second output signal (i.e., a right virtual surround sound signal $S_R$) and output it.

For example, the first output signal is $$S_L = K \cdot \frac{1}{(T^2 - T^2)} \cdot (T + T) \cdot (H - H) \cdot S.$$

And, the second output signal is $$S_R = -K \cdot \frac{1}{(T^2 - T^2)} \cdot (T + T) \cdot (H - H) \cdot S.$$

Here, K is a constant; $T=T_{LL}=T_{RR}$, where $T_{LL}$ is an HRTF signal of the first sound source for an ear of two ears of a sound receiver, and $T_{RR}$ is an HRTF signal of the second sound source for another ear of the two ears; $T'=T_{RL}=T_{LR}$, where $T_{RL}$ is an HRTF signal of the second sound source for the ear, and $T_{LR}$ is an HRTF signal of the first sound is source for the another ear; $H=L_1=R_2$, where L is a sound image signal of the first sound source acting on the ear; and $R_2$ is a sound image signal of the second sound source acting on the another ear; $H'=L_2=R_1$ where $L_2$ is a sound image signal of the first sound source acting on the another ear, and $R_1$ is a sound image signal of the second sound source acting on the ear; and S is an original sound source signal.

Figure 3:
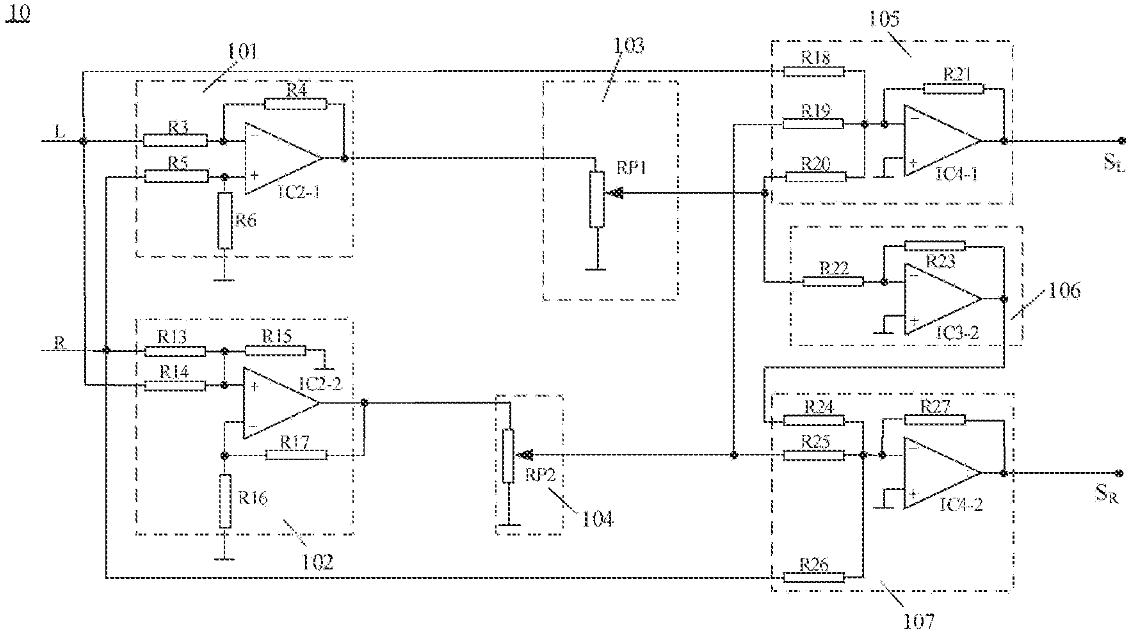
FIG. 3 is a structural diagram of a virtual surround sound production circuit corresponding to the structural block diagram of the virtual surround sound production circuit of FIG. 2.

In the virtual surround sound production circuit 10 provided in the embodiments of the present disclosure, as shown in FIGS. 2 and 3, connection relationships of various circuit units are as follows.

An output terminal of the first sound source is connected to an input terminal of the subtraction unit 101, an input terminal of the first addition unit 102 and an input terminal of the second addition unit 105, so as to input the first signal L to the subtraction unit 101, the first addition unit 102 and the second addition unit 105.

An output terminal of the second sound source is connected to the input terminal of the subtraction unit 101, the input terminal of the first addition unit 102 and an input terminal of the third addition unit 107, so as to input the second signal R to the subtraction unit 101, the first addition unit 102 and the third addition unit 107.

An output terminal of the subtraction unit 101 is connected to an input terminalof the surround sound adjustment unit 103. An output terminal of the surround sound adjustment unit 103 is connected to the input terminal of the second addition unit 105 and an input terminal of the phase inverter unit 106. An output terminal of the phase inverter unit 106 is connected to the input terminal of the third addition unit 107.

An output terminal of the first addition unit 102 is connected to an input terminal of the center compensation unit 104. An output terminal of the center compensation unit 104 is connected to the input terminal of the second addition unit 105 and the input terminal of the third addition unit 107.

The second addition unit 105 performs the addition operation on the first signal L input by the first sound source, the signal adjusted by the surround sound adjustment unit 103 and the signal adjusted by the center compensation unit 104, and an output terminal of the second addition unit 105 outputs the left virtual surround sound signal $S_L$.

The third addition unit 107 performs the addition operation on the second signal R input by the second sound source, the signal adjusted by the phase inverter unit 106 and the signal adjusted by the center compensation unit 104, and an output terminal of the third addition unit 107 outputs the right virtual surround sound signal $S_R$.

For the virtual surround sound production circuit provided in the embodiments of the present disclosure, based on the HRTF theory, in combination with the sound source localization model of the time difference and the intensity difference, a function of a position of the sound source determined by structural characteristics of a human body is obtained from a perspective of physical acoustics. The virtual surround sound production circuit is designed based on a technical principle of a corresponding transmission path, so that a two-channel surround sound system is realized, and a surround effect of planar sound production of a double-sound-source flat panel display device may in turn be realized. In addition, the virtual surround sound production circuit provided in the embodiments of the present disclosure may provide rich signals for distance information by reverberation, and may overcome a problem that the simple HRTF cannot position a distance to the sound source, and may realize the surround sound and determine a sound field at the position of the sound source.

Figure 4:
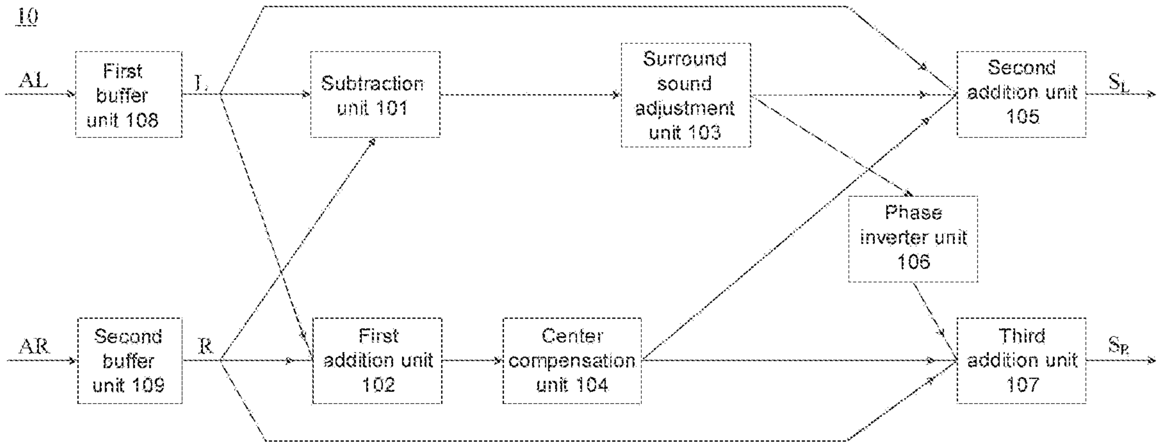
FIG. 4 is a structural block diagram of another virtual surround sound production circuit, in accordance with some embodiment of the present disclosure.

In some embodiments, as shown in FIG. 4, the virtual surround sound production circuit 10 further includes a first buffer unit 108 and a second buffer unit 109.

The first buffer unit 108 is configured to receive an audio signal AL from the first sound source, buffer the audio signal from the first sound source, and then output the first signal L. That is, the first buffer unit 108 may temporarily store to buffer the audio signal AL from the first sound source, and input the first signal L to the subtraction unit 101, the first addition unit 102 and the second addition unit 105 through three channels, respectively.

For example, as shown in FIG. 4, an input terminal of the first buffer unit 108 is configured to receive the audio signal AL from the first sound source, and an output terminal of the first buffer unit 108 is connected to the input terminal of the subtraction unit 101, the input terminal of the first addition unit 102 and the input terminal of the second addition unit 105, so as to output the buffered first signal L to the subtraction unit 101, the first addition unit 102 and the second addition unit 105.

The second buffer unit 109 is configured to receive an audio signal AR from the second sound source, buffer the audio signal from the second sound source, and then output the second signal R. That is, the second buffer unit 109 may temporarily store to buffer the audio signal AR from the second sound source, so as to input the second signal R to the subtraction unit 101, the first addition unit 102 and the third addition unit 107 through three channels, respectively.

For example, an input terminal of the second buffer unit 109 is configured to receive the audio signal AR from the second sound source, and an output terminal of the second buffer unit 109 is connected to the input terminal of the subtraction unit 101, the input terminal of the first addition unit 102 and the input terminal of the third addition unit 107, so as to output the buffered second signal R to the subtraction unit 101, the first addition unit 102 and the third addition unit 107.

It can be understood that, in a case where the input terminal of the first buffer unit 108 receives the audio signal from the first sound source, and the input terminal of the second buffer unit 109 receives the audio signal from the second sound source, the virtual surround sound production circuit 10 provided in the embodiments of the present disclosure may also generate the left virtual surround sound signal $S_L$ and the right virtual surround sound signal $S_R$ that include surround sound information and center sound information and output them.

Figure 5:
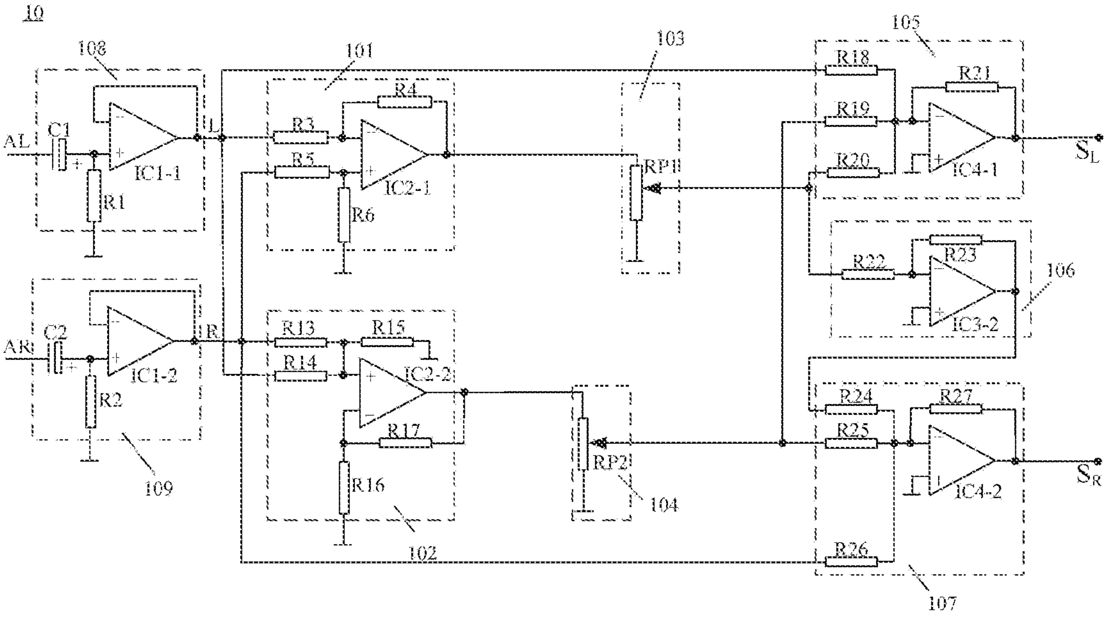
FIG. 5 is a structural diagram of a virtual surround sound production circuit corresponding to the structural block diagram of the virtual surround sound production circuit of FIG. 4.

In some examples, as shown in FIG. 5, the first buffer unit 108 includes a first electrolytic capacitor C1, a first resistor R1 and a first operational amplifier IC1-1. A negative terminal of the first electrolytic capacitor C1 is configured to receive the audio signal from the first sound source. A positive terminal of the first electrolytic capacitor C1 is connected to a first terminal of the first resistor R1 and a positive input terminal of the first operational amplifier IC1-1. A second terminal of the first resistor R1 is grounded. A negative input terminal of the first operational amplifier IC1-1 is connected to an output terminal of the first operational amplifier IC1-1. The output terminal of the first operational amplifier IC1-1 is configured to output the first signal L.

In some examples, as shown in FIG. 5, the second buffer unit 109 includes a second electrolytic capacitor C2, a second resistor $R_2$ and a second operational amplifier IC1-2. A negative terminal of the second electrolytic capacitor C2 is configured to receive the audio signal from the second sound source. A positive terminal of the second electrolytic capacitor C2 is connected to a first terminal of the second resistor $R_2$ and a positive input terminal of the second operational amplifier IC1-2. A second terminal of the second resistor $R_2$ is grounded. A negative input terminal of the second operational amplifier IC1-2 is connected to an output terminal of the second operational amplifier IC1-2. The output terminal of the second operational amplifier IC1-2 is configured to output the second signal R.

The first operational amplifier IC1-1 and the second operational amplifier IC1-2 are each a voltage follower.

In some embodiments, as shown in FIGS. 3, 5, 7, 9 and 11, the subtraction unit 101 includes a third resistor R3, a fourth resistor R4, a fifth resistor R5, a sixth resistor R6 and a third operational amplifier IC2-1.

A first terminal of the third resistor R3 is configured to receive the first signal L. A second terminal of the third resistor R3 is connected to a negative input terminal of the third operational amplifier IC2-1 and a first terminal of the fourth resistor R4. A second terminal of the fourth resistor R4 is connected to an output terminal of the third operational amplifier IC2-1.

A first terminal of the fifth resistor R5 is configured to receive the second signal R. A second terminal of the fifth resistor R5 is connected to a first terminal of the sixth resistor R6 and a positive input terminal of the third operational amplifier IC2-1. A second terminal of the sixth resistor R6 is grounded.

The output terminal of the third operational amplifier IC2-1 is configured to output the third signal.

In some embodiments, as shown in FIGS. 3, 5, 7, 9 and 11, the first addition unit 102 includes a thirteenth resistor R13, a fourteenth resistor R14, a fifteenth resistor R15, a sixteenth resistor R16, a seventeenth resistor R17 and a fifth operational amplifier IC2-2.

A first terminal of the thirteenth resistor R13 is configured to receive the second signal R. A first terminal of the fourteenth resistor R14 is configured to receive the first signal L. A second terminal of the thirteenth resistor R13 is connected to a second terminal of the fourteenth resistor R14, a first terminal of the fifteenth resistor R15 and a positive input terminal of the fifth operational amplifier IC2-2. A second terminal of the fifteenth resistor R15 is grounded.

A first terminal of the sixteenth resistor R16 is connected to a negative input terminal of the fifth operational amplifier IC2-2 and a first terminal of the seventeenth resistor R17. A second terminal of the sixteenth resistor R16 is grounded. A second terminal of the seventeenth resistor R17 is connected to an output terminal of the fifth operational amplifier IC2-2. The output terminal of the fifth operational amplifier IC2-2 is configured to output the center channel signal.

Figure 6:
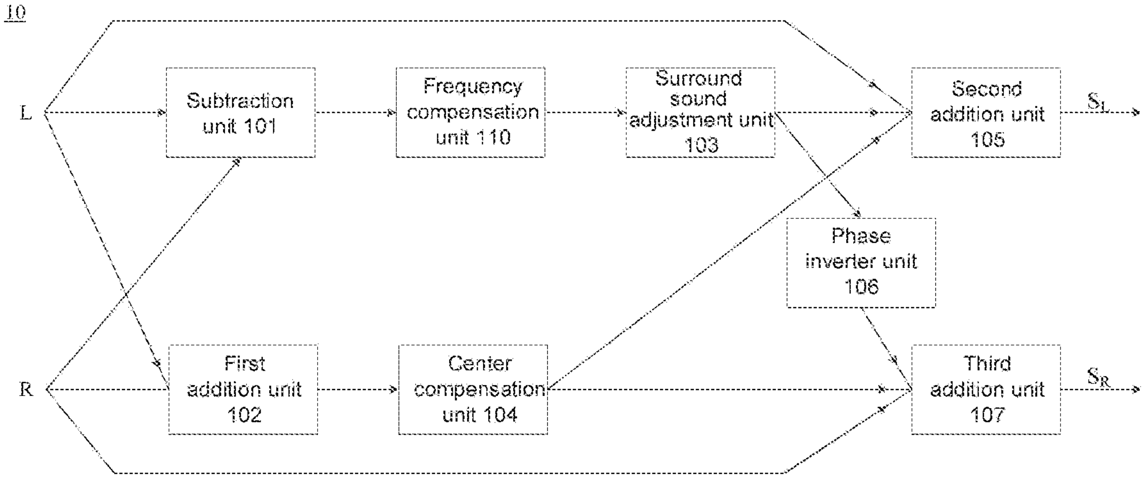
FIG. 6 is a structural block diagram of yet another virtual surround sound production circuit, in accordance with some embodiment of the present disclosure.

In some embodiments, as shown in FIG. 6, the virtual surround sound production circuit 10 further includes a frequency compensation unit 110. The frequency compensation unit 110 is configured to perform a frequency compensation (i.e., a spectrum correction) on the third signal processed by the subtraction unit 101, so as to output the another third signal that has undergone the frequency compensation.

With such a design, the virtual surround sound production circuit is integrated with a tone control function, and may perform negative feedback tone control, thereby reducing frequency distortion and compensating attenuation of mid-frequency.

In some examples, as shown in FIG. 6, an input terminal of the frequency compensation unit 110 is connected to the output terminal of the subtraction unit 101, and an output terminal of the frequency compensation unit 110 is connected to the input terminal of the surround sound adjustment unit 103.

Figure 7:
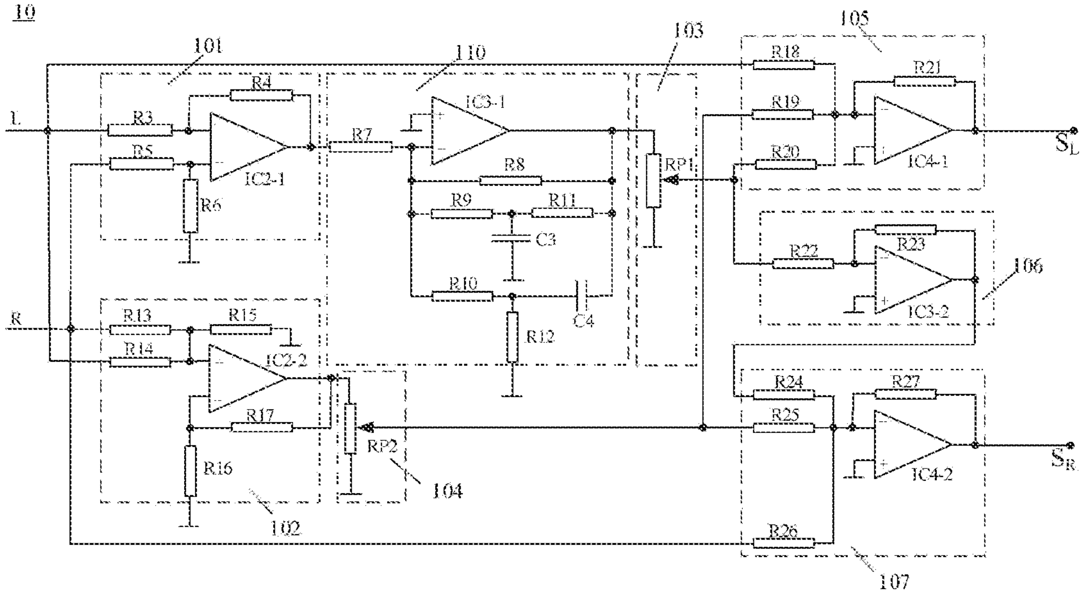
FIG. 7 is a structural diagram of a virtual surround sound production circuit corresponding to the structural block diagram of the virtual surround sound production circuit of FIG. 6.

For example, as shown in FIG. 7, the frequency compensation unit 110 includes a seventh resistor R7, a fourth operational amplifier IC3-1, an eighth resistor R8, a ninth resistor R9, a tenth resistor R10, an eleventh resistor R11, a twelfth resistor R12, a first capacitor C3 and a second capacitor C4.

A first terminal of the seventh resistor R7 is configured to receive the third signal, and a second terminal of the seventh resistor R7 is connected to a negative input terminal of the fourth operational amplifier IC3-1, a first terminal of the eighth resistor R8, a first terminal of the ninth resistor R9 and a first terminal of the tenth resistor R10.

A positive input terminal of the fourth operational amplifier IC3-1 is grounded, An output terminal of the fourth operational amplifier IC3-1 is connected to a second terminal of the eighth resistor R8, a first terminal of the eleventh resistor R11 and a first terminal of the second capacitor C4. The output terminal of the fourth operational amplifier is configured to output a surround sound signal (i.e., the another third signal that has undergone the frequency compensation).

A second terminal of the ninth resistor R9, a second terminal of the eleventh resistor R11 and a first terminal of the first capacitor C3 are connected, and a second terminal of the first capacitor C3 is grounded.

A second terminal of the tenth resistor R10, a second terminal of the second capacitor C4 and a first terminal of the twelfth resistor R12 are connected, and a second terminal of the twelfth resistor R12 is grounded.

The frequency compensation unit 110 is an active frequency compensation circuit composed of low-pass filter and high-pass filter.

In some embodiments, as shown in FIGS. 3, 5, 7, 9 and 11, the surround sound adjustment unit 103 includes a first potentiometer RP1. A first terminal of the first potentiometer RP1 is configured to receive the third signal or the another third signal that has undergone the frequency compensation, a second terminal of the first potentiometer RP1 is grounded, and an adjusting terminal of the first potentiometer RP1 is configured to output the adjusted surround sound signal (i.e., the fourth signal).

In some embodiments, as shown in FIGS. 3, 5, 7, 9 and 11, the center compensation unit 104 includes a second potentiometer RP2. A first terminal of the second potentiometer RP2 is configured to receive the center channel signal, a second terminal of the second potentiometer RP2 is grounded, and an adjusting terminal of the second potentiometer RP2 is configured to output the fifth signal.

In some embodiments, as shown in FIGS. 3, 5, 7, 9 and 11, the second addition unit 105 includes an eighteenth resistor R18, a nineteenth resistor R19, a twentieth resistor R20, a twenty-first resistor R21 and a sixth operational amplifier IC4-1.

A first terminal of the eighteenth resistor R18 is configured to receive the first signal L, a first terminal of the nineteenth resistor R19 is configured to receive the fifth signal, and a first terminal of the twentieth resistor R20 is configured to receive the fourth signal.

A second terminal of the eighteenth resistor R18 is connected to a second terminal of the nineteenth resistor R19, a second terminal of the twentieth resistor R20, a negative input terminal of the sixth operational amplifier IC4-1 and a first terminal of the twenty-first resistor R21.

A positive input terminal of the sixth operational amplifier IC4-1 is grounded.

An output terminal of the sixth operational amplifier IC4-1 is connected to a second terminal of the twenty-first resistor R21, and is configured to output the left virtual surround sound signal $S_L$.

In some embodiments, as shown in FIGS. 3, 5, 7, 9 and 11, the phase inverter unit 106 includes a twenty-second resistor R22, a twenty-third resistor R23 and a seventh operational amplifier IC3-2.

A first terminal of the twenty-second resistor R22 is configured to receive the fourth signal, and a second terminal of the twenty-second resistor R22 is connected to a negative input terminal of the seventh operational amplifier IC3-2 and a first terminal of the twenty-third resistor R23.

A positive input terminal of the seventh operational amplifier IC3-2 is grounded.

An output terminal of the seventh operational amplifier IC3-2 is connected to a second terminal of the twenty-third resistor R23, and is configured to output the phase-inverted signal.

In some embodiments, as shown in FIGS. 3, 5, 7, 9 and 11, the third addition unit 107 includes a twenty-fourth resistor R24, a twenty-fifth resistor R25, a twenty-sixth resistor R26, a twenty-seventh resistor 27 and an eighth operational amplifier IC4-2.

A first terminal of the twenty-fourth resistor R24 is configured to receive the phase-inverted signal, a first terminal of the twenty-fifth resistor R25 is configured to receive the fifth signal, and a first terminal of the twenty-sixth resistor R26 is configured to receive the second signal R.

A second terminal of the twenty-fourth resistor R24 is connected to a second terminal of the twenty-fifth resistor R25, a second terminal of the twenty-sixth resistor R26, a negative input terminal of the eighth operational amplifier IC4-2 and a first terminal of the twenty-seventh resistor R27.

A positive input terminal of the eighth operational amplifier IC4-2 is grounded.

An output terminal of the eighth operational amplifier IC4-2 is connected to a second terminal of the twenty-seventh resistor R27, and is configured to output the right virtual surround sound signal $S_R$.

Figure 8:
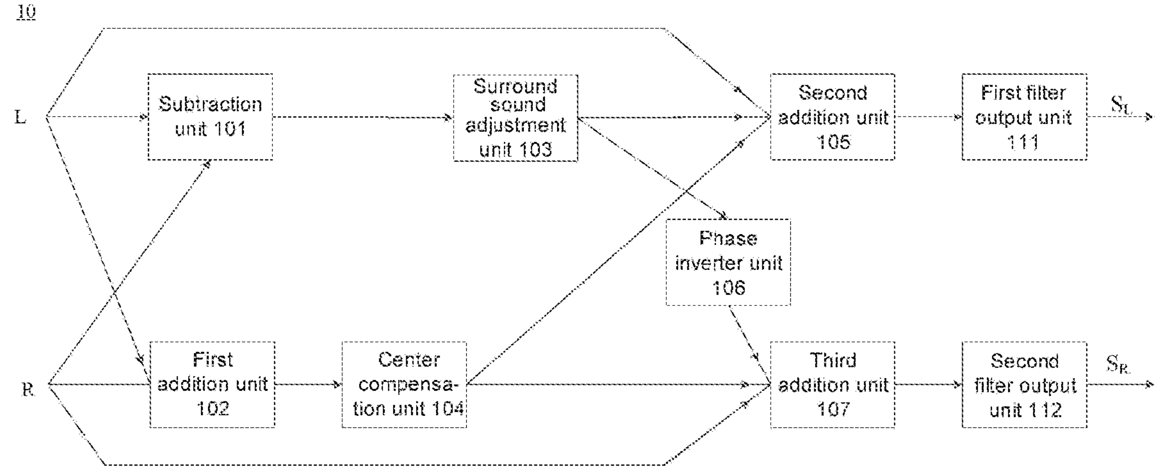
FIG. 8 is a structural block diagram of yet another virtual surround sound production circuit, in accordance with some embodiment of the present disclosure.

In some embodiments, as shown in FIG. 8, the virtual surround sound production circuit 10 further includes a first filter output unit 111 and a second filter output unit 112.

The first filter output unit 111 is configured to filter the left virtual surround sound signal $S_L$, and output the filtered left virtual surround sound signal $S_L$.

The second filter output unit 112 is configured to filter the right virtual surround sound signal $S_R$, and output the filtered right virtual surround sound signal $S_R$.

In these embodiments, the first filter output unit 111 may filter out frequencies within a specific wave band from the first output signal, and the second filter output unit 112 may filter out frequencies within a specific wave band from the second output signal, so that interference of the frequencies may be suppressed and prevented, and the sound quality may be enhanced.

In some examples, as shown in FIG. 8, an input terminal of the first filter output unit 111 is connected to the output terminal of the second addition unit 105, and an output terminal of the first filter output unit 111 is taken as a terminal for outputting the left virtual surround sound signal $S_L$. An input terminal of the second filter output unit 112 is connected to the output terminal of the third addition unit 107, and an output terminal of the second filter output unit 112 is taken as a terminal for outputting the right virtual surround sound signal $S_R$.

Figure 9:
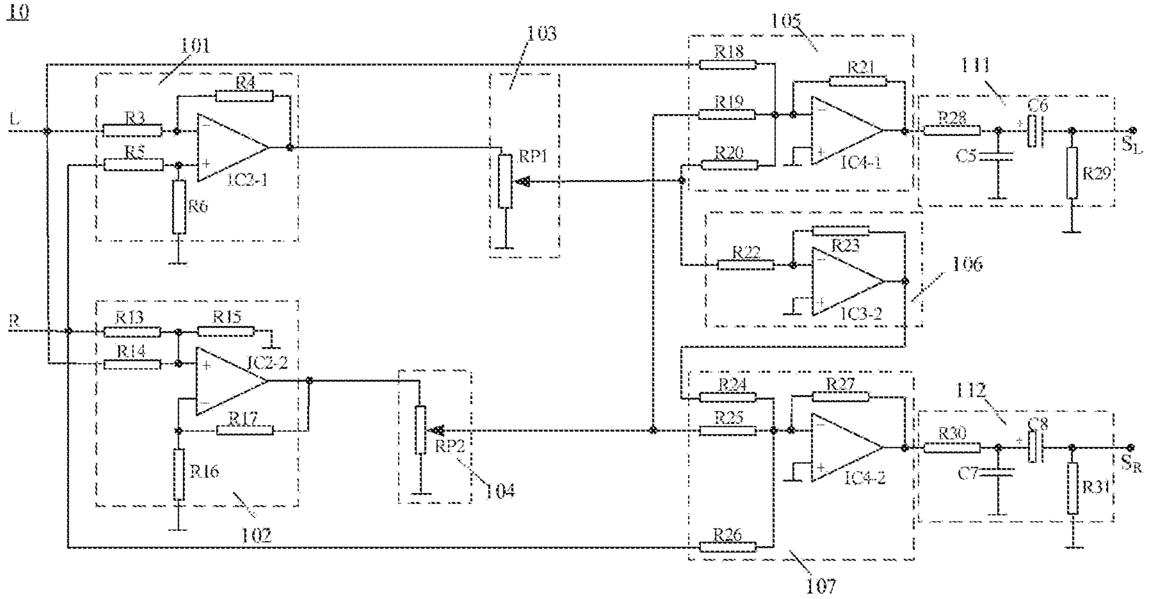
FIG. 9 is a structural diagram of a virtual surround sound production circuit corresponding to the structural block diagram of the virtual surround sound production circuit of FIG. 8.

For example, as shown in FIG. 9, the first filter output unit 111 includes a twenty-eighth resistor R28, a twenty-ninth resistor R29, a third capacitor C5 and a third electrolytic capacitor C6. A first terminal of the twenty-eighth resistor R28 is configured to receive the left virtual surround sound signal $S_L$. A second terminal of the twenty-eighth resistor R28 is connected to a first terminal of the third capacitor C5 and a positive terminal of the third electrolytic capacitor C6. A second terminal of the third capacitor C5 is grounded. A negative terminal of the third electrolytic capacitor C6 is connected to a first terminal of the twenty-ninth resistor R29, and is configured to output the filtered left virtual surround sound signal $S_L$. A second terminal of the twenty-ninth resistor R29 is grounded.

For example, the second filter output unit 112 includes a thirtieth resistor R30, a thirty-first resistor R31 a fourth capacitor C7 and a fourth electrolytic capacitor C8. A first terminal of the thirtieth resistor R30 is configured to receive the right virtual surround sound signal $S_R$. A second terminal of the thirtieth resistor R30 is connected to a first terminal of the fourth capacitor C7 and a positive terminal of the fourth electrolytic capacitor C8. A second terminal of the fourth capacitor C7 is grounded. A negative terminal of the fourth electrolytic capacitor C8 is connected to a first terminal of the thirty-first resistor R31, and is configured to output the filtered right virtual surround sound signal $S_R$. A second terminal of the thirty-first resistor is grounded.

Figure 10:
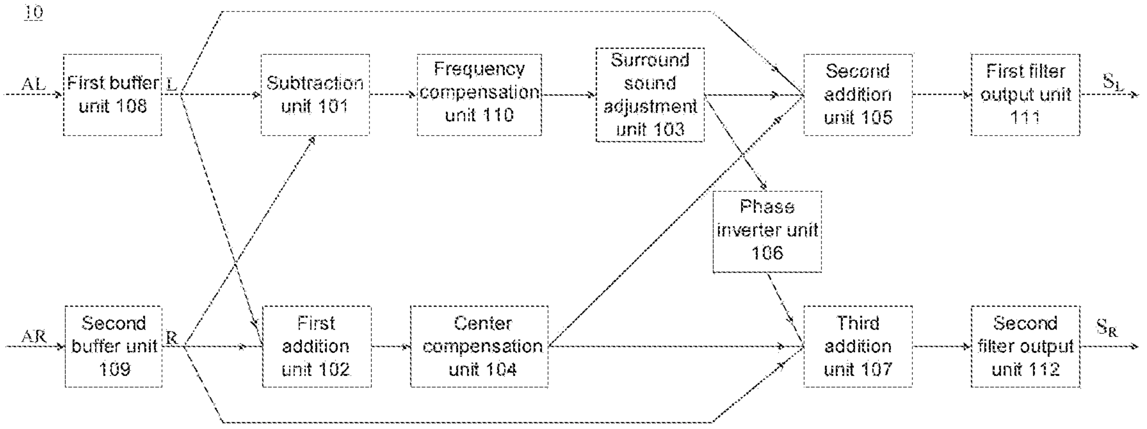
FIG. 10 is a structural block diagram of yet another virtual surround sound production circuit, in accordance with some embodiment of the present disclosure.
Figure 11:
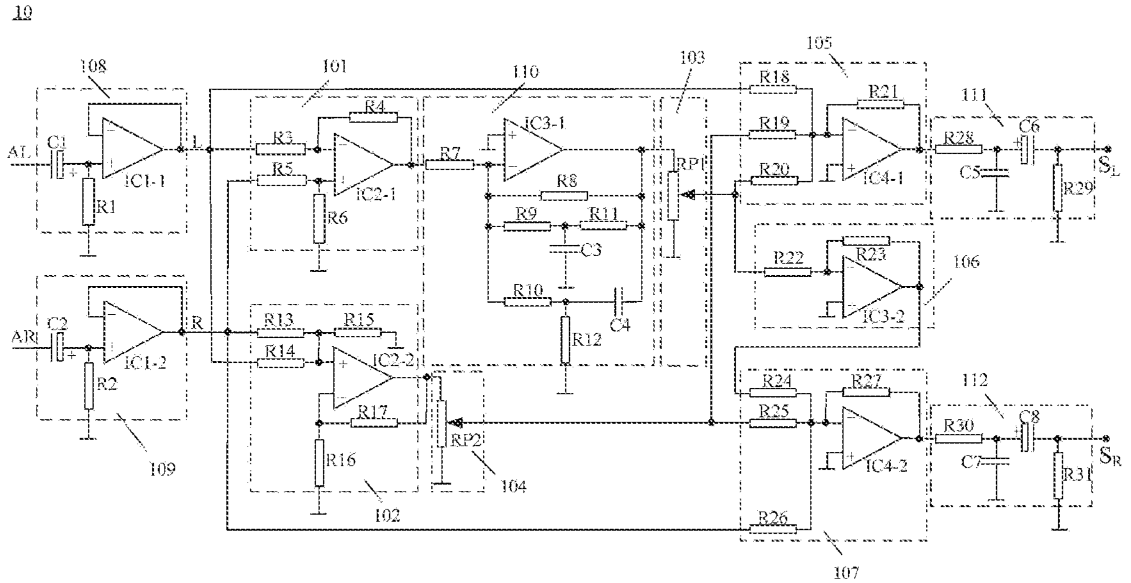
FIG. 11 is a structural diagram of a virtual surround sound production circuit corresponding to the structural block diagram of the virtual surround sound production circuit of FIG. 10.

With continued reference to FIGS. 10 and 11, some embodiments of the present disclosure provide a virtual surround sound production circuit, which includes a subtraction unit 101, a first addition unit 102, a surround sound adjustment unit 103, a center compensation unit 104, a second addition unit 105, a phase inverter unit 106, a third addition unit 107, a first buffer unit 108, a second buffer unit 109, a frequency compensation unit 110, a first filter output unit 111 and a second filter output unit 112.

The arrangement of each unit in the virtual surround sound production circuit may be same as that in any of the above embodiments, and details will not be repeated here.

In the virtual surround sound production circuit 10 provided in the embodiments of the present disclosure, with continued reference to FIGS. 10 and 11, the input terminal of the first buffer unit 108 is configured to receive the audio signal AL from the first sound source, and the input terminal of the second buffer unit 109 is configured to receive the audio signal AR from the second sound source.

The output terminal of the first buffer unit 108 is connected to the input terminal of the subtraction unit 101, the input terminal of the first addition unit 102 and the input terminal of the second addition 105, so as to input the first signal L to the subtraction unit 101 the first addition unit 102 and the second addition unit 105.

The output terminal of the second buffer unit 109 is connected to the input terminal of the subtraction unit 101, the input terminal of the first addition unit 102 and the input terminal of the third addition unit 107, so as to output the second signal R to the subtraction unit 101, the first addition unit 102 and the third addition unit 107.

The subtraction unit 101 performs the subtraction operation on the first signal L and the second signal R, and outputs the third signal. The output terminal of the subtraction unit 101 is connected to the input terminal of the frequency compensation unit 110 to output the third signal to the frequency compensation unit 110. The frequency compensation unit 110 performs the frequency compensation (i.e., the spectrum correction) on the third signal. The output terminal of the frequency compensation unit 110 is connected to the input terminal of the surround sound adjustment unit 103, so as to output the another third signal that has undergone the frequency compensation to the surround sound adjustment unit 103.

The surround sound adjustment unit 103 adjusts the another third signal that has undergone the frequency compensation, i.e., adjusting the component of the surround sound, so as to adjust the intensity of the sense of space of the three-dimensional sound field. The output terminal of the surround sound adjustment unit 103 outputs the fourth signal, and the output terminal of the surround sound adjustment unit 103 is connected to the input terminal of the second addition unit 105 and the input terminal of the phase inverter unit 106, so as to output the fourth signal to the second addition unit 105 and the phase inverter unit 106.

The first addition unit 102 performs the addition operation on the first signal L and the second signal R, and outputs the center channel signal. The output terminal of the first addition unit 102 is connected to the input terminal of the center compensation unit 104 to output the center channel signal to the center compensation unit 104.

The center compensation unit 104 adjusts (i.e., performs the center compensation on) the center channel signal to adjust the intensity of the center sound, and outputs the fifth signal. The output terminal of the center compensation unit 104 is connected to the input terminal of the second addition unit 105 and the input terminal of the third addition unit 107, so as to output the adjusted center channel signal to the second addition unit 105 and the third addition unit 107.

The second addition unit 105 performs the addition operation on the first signal L, the fourth signal and the fifth signal, so as to mix sound and output the left virtual surround sound signal $S_L$. The output terminal of the second addition unit 105 is connected to the input terminal of the first filter output unit 111 to output the left virtual surround sound signal $S_L$ to the first filter output unit 111. The first filter output unit 111 filters the left virtual surround sound signal $S_L$, and outputs the filtered left virtual surround sound signal $S_L$.

The third addition unit 107 performs an addition operation on the second signal R, the phase-inverted signal and the fifth signal, so as to mix sound, and generate the right virtual surround sound signal $S_R$ and output it. The output terminal of the third addition unit 107 is connected to the input terminal of the second filter output unit 112, so as to filter the right virtual surround sound signal $S_R$, and output the filtered right virtual surround sound signal $S_R$.

As described above, based on the HRTF theory, in combination with the sound source localization model of the time difference and the intensity difference, the function of the position of the sound source determined by the structural characteristics of the human body is obtained from the perspective of physical acoustics. The virtual surround sound production circuit is designed based on the technical principle of the corresponding transmission path, so that the design scheme of the two-channel surround sound system may be realized, and the surround effect of the planar sound production of the double-sound-source flat panel display device may in turn be realized. Moreover, the virtual surround sound production circuit provided in the embodiments of the present disclosure is integrated with the tone control function, and may perform the negative feedback tone control, thereby reducing the frequency distortion and compensating the attenuation of the mid-frequency. In addition, the virtual surround sound production circuit provided in the embodiments of the present disclosure may provide rich signals for the distance information by reverberation, and may overcome the problem that the simple HRTF cannot position the distance to the sound source, and may realize the surround sound and determine the sound field at the position of the sound source.

Figure 12:
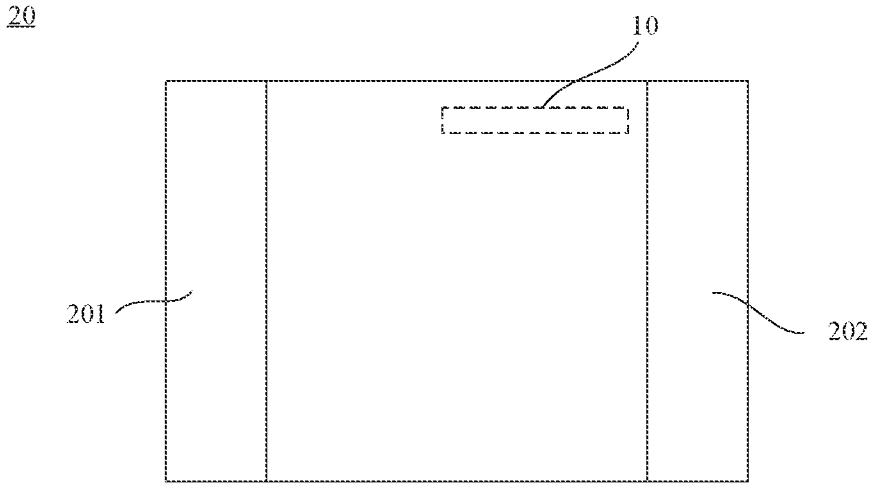
FIG. 12 is a structural diagram of a planar sound source apparatus, in accordance with some embodiments of the present disclosure.

Some embodiments of the present disclosure provide a planar sound source apparatus 20. Referring to FIG. 12, the planar sound source apparatus 20 includes the virtual surround sound production circuit 10, and further includes a left sound source 201 and a right sound source 202. For example, the left sound source 201 and the right sound source 202 may be a left speaker and a right speaker symmetrically arranged along a horizontal direction. One of the left sound source and the right sound source is the first sound source, and the other is the second sound source. The left speaker is used to output the left virtual surround sound signal $S_L$, and the right speaker is used to output the right virtual surround sound signal $S_R$.

For the planar sound source apparatus 20 provided in the embodiments of the present disclosure, by providing the virtual surround sound production circuit, itis possible to convert a sound field of a planar sound source created by the left and right speakers into a sound field of the surround sound, and in turn, the sound quality of the sound source may be improved while a circuit structure and spatial arrangement are simplified.

Figure 13:
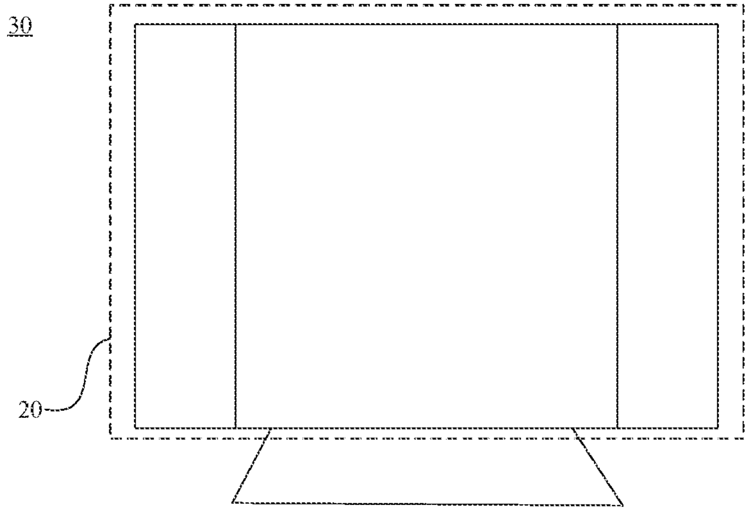
FIG. 13 is a structural diagram of a flat panel display device, in accordance with some embodiments of the present disclosure.

Some embodiments of the present disclosure provide a flat panel display device 30. Referring to FIG. 13, the flat panel display device 30 includes the planar sound source apparatus 20. Based on the virtual surround sound production circuit 10 in the planar sound source apparatus 20, the flat panel display device provided in the embodiments of the present disclosure may realize a display screen sound production system, and may realize a sound field of the surround sound with a position signal by using a surface sound source or a linear sound source.

For example, the flat panel display device may be any product or component with a display function and an audio playback function, such as a television, a large-sized spliced screen, a display, a mobile phone, a tablet computer, a notebook computer or a navigator, which is not limited in the present disclosure.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A virtual surround sound production circuit, comprising:

a subtraction unit configured to perform a subtraction operation on a first signal corresponding to a first sound source and a second signal corresponding to a second sound source, so as to output a third signal;

a first addition unit configured to perform an addition operation on the first signal and the second signal, so as to output a center channel signal;

a surround sound adjustment unit configured to adjust one of the third signal and another third signal that has undergone frequency compensation, so as to output a fourth signal;

a center compensation unit configured to adjust the center channel signal, so as to output a fifth signal;

a second addition unit configured to perform another addition operation on the first signal, the fourth signal and the fifth signal, so as to output a first output signal;

a phase inverter unit configured to perform a phase inversion on the fourth signal, so as to generate a phase-inverted signal; and a third addition unit configured to perform yet another addition operation on the second signal, the fifth signal and the phase-inverted signal, so as to output a second output signal;

wherein the first output signal is $$S_L = K \cdot \frac{1}{\left(T^2 - T^2\right)} \cdot (T + T) \cdot (H - H) \cdot S;$$

and the second output signal is $$S_R = -K \cdot \frac{1}{\left(T^2 - T^2\right)} \cdot (T + T) \cdot (H - H) \cdot S;$$

wherein K is a constant; $T=T_{LL}=T_{RR}$, where $T_{LL}$ is a head related transfer function (HRTF) signal of the first sound source for an ear of two ears of a sound receiver, and $T_{RR}$ is an HRTF signal of the second sound source for another ear of the two ears; $T'=T_{RL}=T_{LR}$, where $T_{RL}$ is an HRTF signal of the second sound source for the ear, and $T_{LR}$ is an HRTF signal of the first sound source for the another ear; $H=L_1=R_2$, where $L_1$ is a sound image signal of the first sound source acting on the ear, and $R_2$ is a sound image signal of the second sound source acting on the another ear; $H'=L_2=R_1$, where $L_2$ is a sound image signal of the first sound source acting on the another ear, and $R_1$ is a sound image signal of the second sound source acting on the ear; and S is an original sound source signal;

the virtual surround sound production circuit further comprises a frequency compensation unit, wherein the frequency compensation unit is configured to perform the frequency compensation on the third signal and output the another third signal that has undergone the frequency compensation;

wherein the frequency compensation unit includes a seventh resistor, a fourth operational amplifier, an eighth resistor, a ninth resistor, a tenth resistor, an eleventh resistor, a twelfth resistor, a first capacitor and a second capacitor, wherein a first terminal of the seventh resistor is configured to receive the third signal, and a second terminal of the seventh resistor is connected to a negative input terminal of the fourth operational amplifier, a first terminal of the eighth resistor, a first terminal of the ninth resistor and a first terminal of the tenth resistor;

a positive input terminal of the fourth operational amplifier is grounded, an output terminal of the fourth operational amplifier is connected to a second terminal of the eighth resistor, a first terminal of the eleventh resistor and a first terminal of the second capacitor, and the output terminal of the fourth operational amplifier is configured to output the another third signal that has undergone the frequency compensation;

a second terminal of the ninth resistor, a second terminal of the eleventh resistor and a first terminal of the first capacitor are connected, and a second terminal of the first capacitor is grounded; and a second terminal of the tenth resistor, a second terminal of the second capacitor and a first terminal of the twelfth resistor are connected, and a second terminal of the twelfth resistor is grounded.

2. The virtual surround sound production circuit according to claim 1, further comprising:

a first buffer unit configured to receive an audio signal from the first sound source and output the first signal; and a second buffer unit configured to receive an audio signal from the second sound source and output the second signal.

3. The virtual surround sound production circuit according to claim 2, wherein the first buffer unit includes a first electrolytic capacitor, a first resistor and a first operational amplifier, wherein a negative terminal of the first electrolytic capacitor is configured to receive the audio signal from the first sound source, a positive terminal of the first electrolytic capacitor is connected to a first terminal of the first resistor and a positive input terminal of the first operational amplifier, a second terminal of the first resistor is grounded, a negative input terminal of the first operational amplifier is connected to an output terminal of the first operational amplifier, and the output terminal of the first operational amplifier is configured to output the first signal; and the second buffer unit includes a second electrolytic capacitor, a second resistor and a second operational amplifier, wherein a negative terminal of the second electrolytic capacitor is configured to receive the audio signal from the second sound source, a positive terminal of the second electrolytic capacitor is connected to a first terminal of the second resistor and a positive input terminal of the second operational amplifier, a second terminal of the second resistor is grounded, a negative input terminal of the second operational amplifier is connected to an output terminal of the second operational amplifier, and the output terminal of the second operational amplifier is configured to output the second signal.

4. The virtual surround sound production circuit according to claim 1, wherein the subtraction unit includes a third resistor, a fourth resistor, a fifth resistor, a sixth resistor and a third operational amplifier, wherein a first terminal of the third resistor is configured to receive the first signal, a second terminal of the third resistor is connected to a negative input terminal of the third operational amplifier and a first terminal of the fourth resistor, and a second terminal of the fourth resistor is connected to an output terminal of the third operational amplifier;

a first terminal of the fifth resistor is configured to receive the second signal, a second terminal of the fifth resistor is connected to a first terminal of the sixth resistor and a positive input terminal of the third operational amplifier, and a second terminal of the sixth resistor is grounded; and the output terminal of the third operational amplifier is configured to output the third signal.

5. The virtual surround sound production circuit according to claim 1, wherein the surround sound adjustment unit includes a first potentiometer, wherein a first terminal of the first potentiometer is configured to receive the third signal or the another third signal that has undergone the frequency compensation, a second terminal of the first potentiometer is grounded, and an adjusting terminal of the first potentiometer is configured to output the fourth signal.

6. The virtual surround sound production circuit according to claim 1, wherein the first addition unit includes a thirteenth resistor, a fourteenth resistor, a fifteenth resistor, a sixteenth resistor, a seventeenth resistor and a fifth operational amplifier, wherein a first terminal of the thirteenth resistor is configured to receive the second signal; a first terminal of the fourteenth resistor is configured to receive the first signal; a second terminal of the thirteenth resistor is connected to a second terminal of the fourteenth resistor, a first terminal of the fifteenth resistor and a positive input terminal of the fifth operational amplifier; a second terminal of the fifteenth resistor is grounded;

a first terminal of the sixteenth resistor is connected to a negative input terminal of the fifth operational amplifier and a first terminal of the seventeenth resistor, and a second terminal of the sixteenth resistor is grounded; a second terminal of the seventeenth resistor is connected to an output terminal of the fifth operational amplifier; and the output terminal of the fifth operational amplifier is configured to output the center channel signal.

7. The virtual surround sound production circuit according to claim 1, wherein the center compensation unit includes a second potentiometer, wherein a first terminal of the second potentiometer is configured to receive the center channel signal, a second terminal of the second potentiometer is grounded, and an adjusting terminal of the second potentiometer is configured to output the fifth signal.

8. The virtual surround sound production circuit according to claim 1, wherein the second addition unit includes an eighteenth resistor, a nineteenth resistor, a twentieth resistor, a twenty-first resistor and a sixth operational amplifier, wherein a first terminal of the eighteenth resistor is configured to receive the first signal, a first terminal of the nineteenth resistor is configured to receive the fifth signal, and a first terminal of the twentieth resistor is configured to receive the fourth signal;

a second terminal of the eighteenth resistor is connected to a second terminal of the nineteenth resistor, a second terminal of the twentieth resistor, a negative input terminal of the sixth operational amplifier and a first terminal of the twenty-first resistor;

a positive input terminal of the sixth operational amplifier is grounded; and an output terminal of the sixth operational amplifier is connected to a second terminal of the twenty-first resistor, and is configured to output the first output signal.

9. The virtual surround sound production circuit according to claim 1, wherein the phase inverter unit includes a twenty-second resistor, a twenty-third resistor and a seventh operational amplifier, wherein a first terminal of the twenty-second resistor is configured to receive the fourth signal, and a second terminal of the twenty-second resistor is connected to a negative input terminal of the seventh operational amplifier and a first terminal of the twenty-third resistor;

a positive input terminal of the seventh operational amplifier is grounded; and an output terminal of the seventh operational amplifier is connected to a second terminal of the twenty-third resistor, and is configured to output the phase-inverted signal.

10. The virtual surround sound production circuit according to claim 1, wherein the third addition unit includes a twenty-fourth resistor, a twenty-fifth resistor, a twenty-sixth resistor, a twenty-seventh resistor and an eighth operational amplifier, wherein a first terminal of the twenty-fourth resistor is configured to receive the phase-inverted signal, a first terminal of the twenty-fifth resistor is configured to receive the fifth signal, and a first terminal of the twenty-sixth resistor is configured to receive the second signal;

a second terminal of the twenty-fourth resistor is connected to a second terminal of the twenty-fifth resistor, a second terminal of the twenty-sixth resistor, a negative input terminal of the eighth operational amplifier and a first terminal of the twenty-seventh resistor;

a positive input terminal of the eighth operational amplifier is grounded; and an output terminal of the eighth operational amplifier is connected to a second terminal of the twenty-seventh resistor, and is configured to output the second output signal.

11. The virtual surround sound production circuit according to claim 1, further comprising:

a first filter output unit configured to filter the first output signal and output the filtered first output signal; and a second filter output unit configured to filter the second output signal and output the filtered second output signal.

12. The virtual surround sound production circuit according to claim 11, wherein the first filter output unit includes a twenty-eighth resistor, a twenty-ninth resistor, a third capacitor and a third electrolytic capacitor, wherein a first terminal of the twenty-eighth resistor is configured to receive the first output signal, and a second terminal of the twenty-eighth resistor is connected to a first terminal of the third capacitor and a positive terminal of the third electrolytic capacitor; a second terminal of the third capacitor is grounded; a negative terminal of the third electrolytic capacitor is connected to a first terminal of the twenty-ninth resistor, and is configured to output the filtered first output signal; and a second terminal of the twenty-ninth resistor is grounded; and the second filter output unit includes a thirtieth resistor, a thirty-first resistor, a fourth capacitor and a fourth electrolytic capacitor, wherein a first terminal of the thirtieth resister is configured to receive the second output signal, and a second terminal of the thirtieth resistor is connected to a first terminal of the fourth capacitor and a positive terminal of the fourth electrolytic capacitor; a second terminal of the fourth capacitor is grounded; a negative terminal of the fourth electrolytic capacitor is connected to a first terminal of the thirty-first resistor, and is configured to output the filtered second output signal; and a second terminal of the thirty-first resistor is grounded.

13. A planar sound source apparatus, comprising:

the virtual surround sound production circuit according to claim 1.

14. A flat panel display device, comprising:

the planar sound source apparatus according to claim 13.

15. The planar sound source apparatus according to claim 13, wherein the virtual surround sound production circuit further includes:

a first buffer unit configured to receive an audio signal from the first sound source and output the first signal; and a second buffer unit configured to receive an audio signal from the second sound source and output the second signal.

16. The planar sound source apparatus according to claim 13, wherein the virtual surround sound production circuit further includes:

a first filter output unit configured to filter the first output signal and output the filtered first output signal; and a second filter output unit configured to filter the second output signal and output the filtered second output signal.

* * * * *